United States Patent
Barenyi et al.

[11] 3,907,358
[45] Sept. 23, 1975

[54] DOOR FOR PASSENGER MOTOR VEHICLES

[75] Inventors: Bela Barenyi, Maichingen; Hermann Renner, Magstadt, both of Germany

[73] Assignee: Daimler-Benz Aktiengesellschaft, Stuttgart, Germany

[22] Filed: Nov. 24, 1972

[21] Appl. No.: 309,482

[30] Foreign Application Priority Data
Nov. 26, 1971  Germany.......................... 2158709

[52] U.S. Cl.................. 296/146; 49/502; 296/28 R
[51] Int. Cl................................................ B60j 5/04
[58] Field of Search.......... 296/28 R, 146, 152, 153, 296/149; 49/502

[56] References Cited
UNITED STATES PATENTS
2,005,198  6/1935  Morrison ........................ 296/146 X
2,058,181  10/1936  Schankin.......................... 296/28 R
3,155,421  11/1964  Barenyi............................... 296/153
3,449,881  6/1969  Wilfert.............................. 49/502 X FOREIGN PATENTS OR APPLICATIONS
1,189,810  4/1970  United Kingdom................... 49/502

Primary Examiner—Robert J. Spar
Assistant Examiner—Leslie J. Paperner
Attorney, Agent, or Firm—Craig & Antonelli

[57] ABSTRACT

A door for passenger motor vehicles, in particular a side door which includes an inner sheet metal panel and an outer sheet metal panel as well as a hollow bearer provided within the area of the lower edge of the door and extending in the vehicle longitudinal direction which projects into the vehicle interior space beyond the inner panel.

27 Claims, 4 Drawing Figures

US Patent   Sept. 23,1975   3,907,358

DOOR FOR PASSENGER MOTOR VEHICLES

The present invention relates to a door for a passenger motor vehicle, especially to a side door which includes a door inner sheet metal member or panel and a door outer sheet metal member or panel.

In order to protect the vehicle passengers against accident consequences, it is necessary to construct the area of the passenger cell of a vehicle as form-rigid as possible. The dissipation of the kinetic energy present in case of an accident is to take place outside the area of the vehicle passenger cell. The lateral area of the motor vehicle, in which are generally provided doors, thereby offers particular difficulties. For spatial reasons, the doors cannot be dimensioned beyond a certain thickness whereas, on the other hand, they cannot be constructed too heavy because of their movability about vertical pins or hinges or the like.

The present invention is concerned with the task to construct a door of the aforementioned type with slightest possible structural expenditures and without significant reduction of the vehicle interior space as safety door which possesses a high rigidity against deformations. The present invention essentially consists in that a hollow bearer extending in the vehicle longitudinal direction is provided within the area of the lower edge of the door, which projects in the direction toward the vehicle interior space beyond the door inner sheet metal member or panel. This hollow bearer which does not excessively increase the weight of a door is arranged in the area in which are disposed the bumpers of a vehicle impinging laterally against the vehicle so that a maximum degree of reinforcement at the decisive place is obtained by this hollow bearer with relatively low expenditures. Therebeyond, these hollow bearers are located underneath the area of the vehicle interior space so that no decrease or reduction of the driver comfort results; for the area essential for the driving comfort is located at the height of the upper body of the vehicle passengers.

In one embodiment of the present invention provision is made that the ends of the hollow bearer terminate or run out with a flat beveling or with a rounded-off portion into the plane of the door inner sheet metal member or panel. It is achieved by this construction that the reinforcement of this door does not lead or leads only to an insignificant impairment of the space available when boarding and leaving the vehicle. For the same purpose, in another embodiment of the present invention, provision is made that the wall of the hollow bearer pointing in the direction toward the vehicle interior space extends along a circular arc, as viewed in plan view.

In a simple embodiment of the present invention, the hollow bearer consists of the inner sheet metal member or panel of the door and of a mounted-on profile or sectional member. This embodiment requires only slight changes in the customary door construction.

In another embodiment of the present invention, the door inner sheet metal member or panel is provided with a pressed-out or stamped-out portion within the area of the lower edge of the door which is closed on the inside of the door by a profile or sectional member. It is thereby possible to utilize the profile or the like disposed on the inside of the door, i.e., between the inner sheet metal member or panel and the outer sheet metal member or panel of the door for the further internal reinforcement of the door.

It will be appropriate in practice if the hollow bearer is covered off with a foamed material of any conventional type toward the vehicle interior. The injury danger is reduced thereby which exists for a vehicle passenger hitting against the door in case of an accident.

Accordingly, it is an object of the present invention to provide a door for passenger motor vehicles which avoids by simple means the aforementioned shortcomings and drawbacks encountered in the prior art.

Another object of the present invention resides in a door, especially in a side door of a passenger motor vehicle which is capable of dissipating the kinetic energy in case of laterally directed impacts, yet avoids an unduly heavy construction.

A further object of the present invention resides in a safety door for motor vehicles, especially passenger motor vehicles which offers great safety with lowest possible structural expenditures and without significant reduction of the vehicle interior space.

Still another object of the present invention resides in a door which permits the realization of a maximum reinforcement at the decisive places with relatively small structural expenditures.

Another object of the present invention resides in a passenger motor vehicle door constructed as safety door which assures a high degree of safety to the vehicle passengers against lateral impacts yet does not impair the ease of ingress and egress from the vehicle.

These and further objects, features and advantages of the present invention will become more apparent from the following description when taken in connection with the accompanying drawing which shows, for purposes of illustration only, two embodiments in accordance with the present invention, and wherein.

Figure 1:
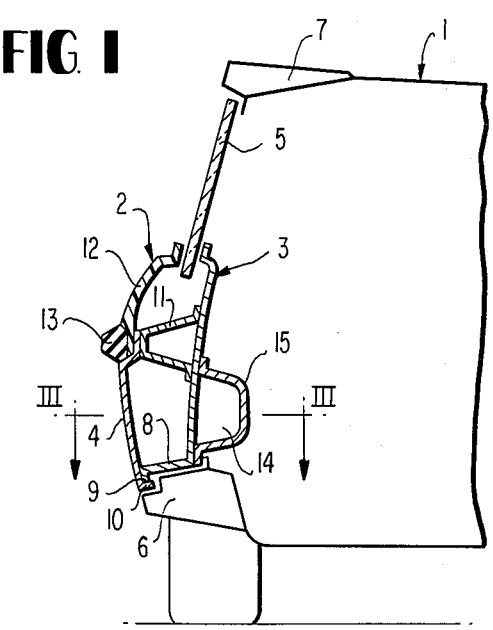
FIG. 1 is a somewhat schematic, vertical cross-sectional view through a door according to the present invention.

referring now to the drawing wherein like reference numerals are used throughout the various views to designate like parts, and more particularly to FIG. 1, there is illustrated in this figure within the indicated contour of a motor vehicle generally designated by reference numeral 1 a side door generally designated by reference numeral 2 which essentially consists of a door inner sheet metal member or panel generally designated by reference numeral 3, of a door outer sheet metal member or panel 4 and of a preferably lowerable side window 5. The door 2 is disposed between a longitudinal bearer 6 and a roof longitudinal bearer 7 which are each constructed as hollow bearer.

Both the inner sheet metal member or panel 3 of the door as also the outer sheet metal member or panel 4 of the door are curved outwardly, i.e., are of convex configuration. The edges of the door inner sheet metal member or panel 3 and of the door outer sheet metal member or panel 4 are connected with each other preferably by spot welding except for a slot for the side window 5. For that purpose, the door inner sheet metal member or panel 3 is provided at three sides thereof with an outwardly angularly bent edge 8 which rests with a flange 9 inwardly against the door outer sheet metal member or panel 4, against which it abuts. The edge 10 of the door outer sheet metal member or panel 4 is angularly bent about this flange 9.

In the embodiment according to FIG. 1, the door outer sheet metal member or panel 4 extends only to approximately half the height of the door inner sheet metal member or panel 3. Its upper edge is connected with the door inner sheet metal member 3 by way of a profile or sectional rail 11 which together with the door inner sheet metal member 3 forms a hollow bearer disposed between the latter and the door outer sheet metal member 4. A plastic member 12 of any conventional plastic material, such as synthetic resinous material, adjoins the door outer sheet metal member or panel 4 in the upward direction whereby a particularly decorative impression is obtained. The transition between the door outer sheet metal member or panel 4 and the plastic part 12 is covered off by a protective strip 13 of elastic plastic material or rubber or the like.

A hollow bearer 14 is provided within the area of the lower edge of the side door 2 which projects inwardly beyond the door inner sheet metal member or panel 3 in the direction toward the vehicle interior. This hollow bearer 14 is constituted by a sheet metal profile or sectional member 15 of hat-shaped cross section and by the door inner sheet metal member or panel 3 whereby the flanges of the sheet metal profile 15 which extend in the direction of and abut at the door inner sheet metal member 3 are secured, for example, by spot-welding. The hollow bearer 14 is disposed close above the longitudinal bearer 6 and thus within an area of the passenger space which in most vehicles is present unused. This area is disposed approximately at the height at which is arranged the bumper of a vehicle which impinges laterally against the door 2 in case of a collision.

Figure 3:
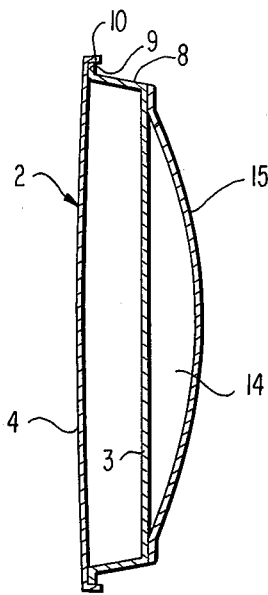
FIG. 3 is a cross-sectional view taken along line III-III of FIG. 1.

As shown in FIG. 3, the inner wall of the sheet metal profile or section member 15 extends along a circular arc whose center point is located in the extension of the door center. As a result thereof, the hollow bearer 14 acts between the vertical door columns (not shown) which adjoin the door 2 forwardly and rearwardly thereof, as bending bearer of even or uniform rigidity or strength. A considerable increase in the door rigidity is obtained by the same whereas the convenience during the boarding and leaving is not reduced or reduced only insignificantly by its particular configuration.

Figure 2:
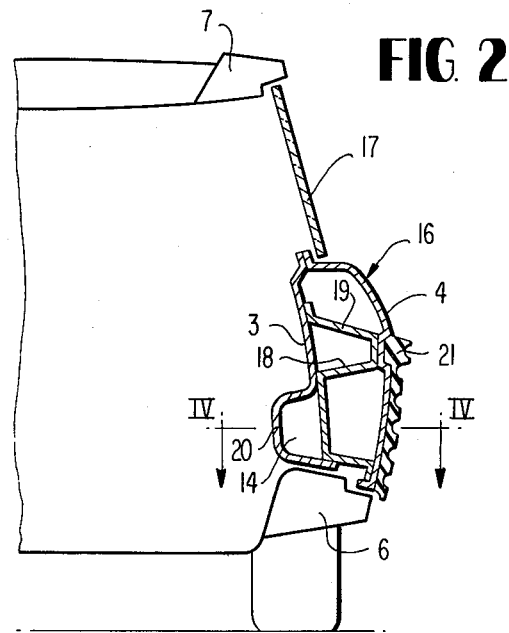
FIG. 2 is a somewhat schematic, vertical cross-sectional view through a modified embodiment of a door in accordance with the present invention.
Figure 4:
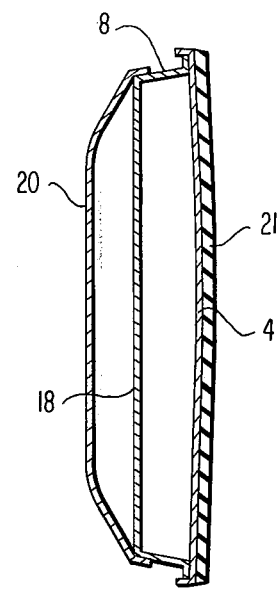
FIG. 4 is a cross-sectional view taken along line IV-IV of FIG. 2.

The embodiment according to FIGS. 2 and 4 corresponds essentially in its function to the embodiment according to FIGS. 1 and 3. Also, in this embodiment, the side door generally designated by reference numeral 16 which, for example, is pivotal about a vertical axis, consists of a door inner sheet metal member or panel 3 and of a door outer sheet metal member or panel 4 as well as of a non-lowerable side window 17. In this embodiment, a profile or sectional rail 18 is provided between the door outer sheet metal member 4 and the door inner sheet metal member 3 whose edges angularly bent off outwardly are connected continuously with the outer sheet metal member 4 of the door, for example, by spot welding. The upper edge 19 of the profile rail 18 is once more returned from the door outer sheet metal member or panel 4 toward the door inner sheet metal member or panel 3 and is also connected again with the latter by spot-welding or the like.

In this embodiment, the door inner sheet metal member or panel 3 has a pressed-out portion 20 which forms a hollow bearer 14 extending in the vehicle longitudinal direction within the area of the lower door edge, which hollow bearer 14 is also disposed closely above the longitudinal bearer 6. In this embodiment, the ends of the hollow bearer 14 run out or terminate with flat bevelled surfaces of slight inclination toward the door inner sheet metal member or panel 3, i.e., have slightly bevelled end portions (FIG. 4) so that the convenience during the boarding and leaving remains unimpaired in a manner similar as in the embodiment according to FIGS. 1 and 3.

In the embodiment according to FIGS. 2 and 4, the door outer sheet metal member or panel 4 is covered completely in its lower area with a ramming or protective strip 21 of rubber or plastic material or the like. It is favorable in practice if the three inwardly pointing surfaces of the hollow bearer 14 of FIGS. 1 and 2 are protected with a foamed material of any conventional type, such as a synthetic resinous foamed material in a manner not illustrated in detail whereby this foamed material may receive different layers having different compositions and coefficients of hardness which can be selected corresponding to the respective requirements. Additionally, it is possible to provide further reinforcements by additional hollow bearers on the inside of the door between the door inner sheet metal members or panels 3 and the door outer sheet metal members or panels 4.

While we have shown and described two embodiments in accordance with the present invention, it is understood that the same is not limited thereto but is susceptible of numerous changes and modifications as known to those skilled in the art. For example, the various parts of the door construction in accordance with the present invention may also be made of any other suitable material as known in the art. Hence, we do not wish to be limited to the details shown and described herein but intend to cover all such changes and modifications as are encompassed by the scope of the appended claims.

We claim:

1. A vehicle door comprising
    an inner door panel means,
    an outer door panel means, said inner door panel means being spaced from said outer door panel means such that said inner and outer door panel means are on opposing sides of an extension of the plane of a vehicle door window, and
    a closed hollow reinforcing bearer means extending in a longitudinal direction along a lower edge of said inner door panel means such that vehicle passengers are protected from lateral impacts against the vehicle door, said hollow bearer means projecting from said inner door panel means into a vehicle interior space.

2. A door according to claim 1, characterized in that said inner and outer door panel means are constituted by sheet metal members.

3. A door according to claim 1, characterized in that the door is a side door for a passenger motor vehicle.

4. A door according to claim 1, characterized in that at least one edge of the hollow bearer means terminates in the plane of the inner door panel means by way of a relatively flat inclination.

5. A door according to claim 1, characterized in that at least one edge of the hollow bearer means terminates in the plane of the inner door panel means by way of a rounded-off portion.

6. A door according to claim 1, characterized in that at least two edges of the hollow bearer means terminates in the plane of the inner door panel means by way of slightly obliquely directed portions.

7. A door according to claim 1, characterized in that at least two edges of the hollow bearer means terminate in the plane of the inner door panel means by way of rounded-off portions.

8. A door according to claim 1, characterized in that the wall of the hollow bearer means projecting toward the vehicle interior extends along a substantially circular arc, as viewed in plan view.

9. A door according to claim 1, characterized in that the hollow bearer means consists of the inner panel means and of a profile member mounted thereon.

10. A door according to claim 1, characterized in that the hollow bearer means is covered with foamed material in the direction toward the vehicle interior.

11. A door according to claim 1, characterized by reinforcing profile means between the inner and outer door panel means.

12. A door according to claim 11, characterized in that said reinforcing profile means forms part of the hollow bearer means, said hollow bearer means being closed on the inside of the door by said reinforcing profile means.

13. A door according to claim 1, characterized in that said hollow bearer means is arranged closely above a longitudinal vehicle bearer.

14. A door according to claim 13, characterized in that the door is a side door for a passenger motor vehicle.

15. A door according to claim 14, characterized in that the hollow bearer means consists of the inner panel means and of a profile member mounted thereon.

16. A door according to claim 15, characterized in that at least two edges of the hollow bearer means terminate in the plane of the inner door panel means by way of slightly obliquely directed portions.

17. A door according to claim 15, characterized in that at least two edges of the hollow bearer means terminate in the plane of the inner door panel means by way of rounded-off portions.

18. A door according to claim 15, characterized in that the wall of the hollow bearer means projecting toward the vehicle interior extends along a substantially circular arc, as viewed in plan view.

19. A door according to claim 15, characterized in that the hollow bearer means is covered with foamed material in the direction toward the vehicle interior.

20. A door for a passenger motor vehicle which includes an inner door panel means and an outer door panel means, characterized in that a hollow bearer means extending in the vehicle longitudinal direction is provided within the area of the lower edge of the door, said hollow bearer means projecting beyond the inner panel means toward the vehicle interior space, and characterized in that the inner panel means is provided with a pressed-out portion within the area of the lower edge of the door, said pressed-out portion being closed on the inside of the door by a profile means.

21. A door for a passenger motor vehicle which includes an inner door panel means and an outer door panel means, characterized in that a hollow bearer means extending in the vehicle longitudinal direction is provided within the area of the lower edge of the door, said hollow bearer means projecting beyond the inner panel means toward the vehicle interior space, characterized in that said hollow bearer means is arranged closely above a longitudinal vehicle bearer, characterized in that the door is a side door for a passenger motor vehicle, and characterized in that the inner panel means is provided with a pressed-out portion within the area of the lower edge of the door, said pressed-out portion being closed on the inside of the door by a profile means.

22. A door according to claim 21, characterized in that at least two edges of the hollow bearer means terminate in the plane of the inner door panel means by way of slightly obliquely directed portions.

23. A door according to claim 21, characterized in that at least two edges of the hollow bearer means terminate in the plane of the inner door panel means by way of rounded-off portions.

24. A door according to claim 21, characterized in that the wall of the hollow bearer means projecting toward the vehicle interior extends along a substantially circular arc, as viewed in plan view.

25. A door according to claim 21, characterized in that the hollow bearer means is covered with foamed material in the direction toward the vehicle interior.

26. A door according to claim 21, characterized in that said profile means is a reinforcing profile means between the inner and outer door panel means.

27. A door according to claim 26, characterized in that said reinforcing profile means forms part of the hollow bearer means, said hollow bearer means consisting of said pressed-out portion being closed on the inside of the door by said reinforcing profile means.

* * * * *